United States Patent Office 3,343,599
Patented Sept. 26, 1967

3,343,599
METHOD OF REDUCING THE POROSITY OF SUBTERRANEAN POROUS FORMATIONS
William N. Eddins, Jr., and Kenneth J. Lissant, St. Louis, Mo., assignors to Petrolite Corporation, Wilmington, Del., a corporation of Delaware
No Drawing. Filed May 10, 1965, Ser. No. 454,719
4 Claims. (Cl. 166—21)

ABSTRACT OF THE DISCLOSURE

Method of reducing the porosity and/or permeability of subterranean porous formations by injecting into such formations a fluid immiscible with connate fluids and containing therein a surface material agent, for example, an oxyalkylated surfactant having the general formula $$Z[(OR)_nOH]_m$$

wherein Z is the oxyalkylatable material, R is the radical derived from the alkylene oxide which can be, for example, ethylene, propylene, butylene, epichlorohydrin and the like, $n$ is a member determined by the moles of alkylene oxide reacted, for example 1 to 2000 or more, and $m$ is a whole number determined by the number of reactive oxyalkylatable groups, said surface active material being capable of emulsifying the connate fluid into the immiscible injected fluid so as to produce a viscous, high internal phase ratio, thixotropic emulsion, the internal phase of said emulsion comprising at least about 70% by volume of the emulsion, for example, about 80–95%, such as about 85–95%, but preferably about 88–93%, said emulsion having a viscosity sufficient to block the permeable formation.

---

This invention relates to a method for reducing the porosity and/or permeability of subterranean formations. More particularly, this invention relates to a method for reducing the porosity and/or permeability of subterranean formations which process is characterized by injecting into said formation a fluid immiscible with the connate fluids and containing therein a surface active material capable of emulsifying the connate fluid into the immiscible injected fluid to produce a viscous, high internal phase ratio emulsion.

Among the most complex problems with which engineers engaged in oil-field development must contend are those encountered in the exclusion of subsurface waters from wells, from oil- and gas-producing formations, etc. If water enters from an overlying source, it may accumulate in the bottom of a well until it develops sufficient static head to seriously restrict influx of oil and gas from the producing formation. Sometimes the head developed is so great that water enters the producing strata and forces the oil and gas away from the vicinity of the well. Water entering an oil sand in this way wets the exposed surfaces of the reservoir rock and fills the pore spaces so that they do not subsequently yield readily to the passage of oil through them. If, in this way, a large volume of water is permitted to enter an oil-bearing formation through a well, it may migrate through the producing formations and influence the production of wells at a considerable distance from the point of entrance.

Aside from its influence on oil and gas production, the presence of water in the oil produced by a well increases the cost of operation, often necessitating the pumping of a large volume of worthless fluid which must be separated from the oil after it reaches the surface. Water-oil mixtures in the well often form emulsions from which the oil may be extracted only with great difficulty and expense. Ground waters are often corrosive and metal casings and well equipment in contact with them sometimes deteriorate rapidly.

Because of the difficulties that result from the presence of water in oil and gas wells, it should be excluded by suitable means. The necessity for water exclusion is recognized by all oil producers and is prescribed by law in most oil-producing States and countries. Water-exclusion methods have received a great deal of attention and are now well developed, particularly in certain regions where the menace of water incursion is recognized as a problem of vital importance.

In addition to excluding undesirable subterranean water in (a) gas and mud drilling operations (b) in the producing intervals of oil and gas wells (c) in the foreign zones of producing or injection wells, this invention can also be used (1) to improve the injection profile in any type of injection well; (2) in sealing off high gas-oil ratio formation in conserving gas. The production of large quantities of gas per unit of oil (high gas/oil ratio) is undesirable on account of the waste of reservoir energy and consequent rapid decline of pressure. A further incentive is the reduction of oil allowables which is the common penalty imposed by regulating bodies when excessive gas is produced; (3) in sealing formations subject to in situ combustion; (4) in plugging any well which might be desirable to complete at a later date; (5) in prevention of the intrusion of fluids such as water into mines or excavations, etc.

Heretofore many methods for reducing porosity have been employed, for example cement, plastics, inert solids, inorganic precipitates such as antimony trichloride to yield antimony oxychloride on contact with water, silicon tetrachloride to form silicic acid on contact with water, silica gel, etc.

We have now discovered a method of reducing the porosity and/or permeability of subterranean formation which is characterized by treating said formations by injecting into said formation a fluid immiscible with the connate fluids and containing therein a surface active material capable of emulsifying the connate fluid into the immiscible injected fluid to produce a viscous, high internal phase ratio, emulsion. Unlike anything described in the prior art, blocking achieved by this method is permanent, selective and reversible under the proper conditions. For example, when a hydrocarbon solvent containing a proper emulsifier is pumped into a well, the blocking is selective since in the area where the hydrocarbon-emulsifier system is squeezed into a permeable formation containing water, a viscous blocking emulsion is formed. No emulsion is formed where water is absent. The blocking is reversible if desired because these emulsions after formation are dilutable with the external phase under proper conditions and thus can be removed from the formation by the appropriate solvent and/or pressure system.

The emulsions employed in this invention are unique. They are stable, viscous, thixotropic emulsions of high internal phase. The external phase may be oil or water depending on the system in which it is used. For example the external phase should be unlike the system with which it is in contact. Thus, where one desires to block an aqueous system, such as in water intrusion, one would employ an oil external phase. Where one desires to block an oily system, such as where the system is in contact with petroleum, one would employ an aqueous external phase. Therefore, the invention encompasses both W/O and O/W emulsions.

In general, it is preferred to prepare the emulsion in situ. Thus, where one wishes to block aqueous intrusion, an oily solution of a suitable emulsifier is forced into a well. When this solution comes in contact with a permeable area of aqueous intrusion of connate fluids, the oily solution of emulsifier will be forced into the formation under sufficient pressure to form the emulsion of this invention which in this case would be a W/O emulsion. The emulsion, being viscous and hydrophobic, would seal the pores of the formation and thus prevent water intrusion. The formation of emulsions would be selective since no emulsion will form where there is no contact with water.

Contrariwise, where one desires to block oil intrusion through a permeable formation, one would prepare an aqueous solution of a suitable emulsifier, force it under pressure into the well so that when it comes in contact with oil in the permeable area of the well, a water external emulsion would be formed.

In certain formations which contain little of any liquid, the pure blocking emulsion of this invention can be prepared by first flooding with either water or oil and then injecting the appropriate immiscible liquid in which the emulsifier is dissolved so as to form the desired emulsion.

Any suitable emulsifier can be employed. The emulsifiers which we most usually employ in the practice of our invention are generally known as oxyalkylated surfactants or more specifically polyalkylene ether or polyoxyalkylene surfactants. Oxyalkylated surfactants as a class are well known. The possible sub-classes and specific species are legion. The methods employed for the preparation of such oxyalkylated surfactants are also to well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Patents 2,588,771 and 2,596,091–3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while, subsequent additions of high alkoxy chains tend to increase the oil solubility. In general, the final solubility and surfactant properties are a result of a balance between the oil-soluble and water-soluble portions of the molecule.

In the practice of our invention we have found that emulsifiers suitable for the preparation of high internal phase ratio emulsions may be prepared from a wide variety of starting materials. For instance, if we begin with an oil-soluble material such as a phenol or a long chain fatty alcohol and prepare a series of products by reaction with successive portions of ethylene oxide, we find that the members of the series are successively more water-soluble. We find also that somewhere in the series there will be a limited range where the products are useful for the practice of our invention. Similarly it is possible to start with water or a water-soluble material such as polyethylene glycol and add, successively, portions of propylene oxide. The members of this series will be progressively less water-soluble and more oil-soluble. Again there will be a limited range where the materials are useful for the practice of our invention.

In general, the compounds which would be selected for testing as to their suitabilty are oxyalkylated surfactants of the general formula $$Z[(OR)_nOH]_m$$

wherein Z is the oxyalkylatable material, R is the radical derived from the alkylene oxide which can be, for example, ethylene, propylene, butylene, epichlorohydrin and the like, $n$ is a number determined by the moles of alkylene oxide reacted, for example 1 to 2000 or more and $m$ is a whole number determined by the number of reactive oxyalkylatable groups. Where only one group is oxyalkylatable as in the case of a monofunctional phenol or alcohol R'OH, then $m=1$. Where Z is water, or a glycol, $m=2$. Where Z is glycerol, $m=3$, etc.

In certain cases, it is advantageous to react alkylene oxides with the oxyalkylatable material in a random fashion so as to form a random copolymer on the oxyalkylene chain, i.e., the $[(OR)_nOH]_m$ chain such as

—AABAAABBABABBABBA—

In addition, the alkylene oxides can be reacted in an alternate fashion to form block copolymers on the chain, for example —BBBAAABBBAAAABBBB— or

—BBBBAAACCCAAAABBBB— where A is the unit derived from one alkylene oxide, for example ethylene oxide, and B is the unit derived from a second alkylene oxide, for example propylene oxide, and X is the unit derived from a third alkylene oxide, for example, butylene oxide, etc. Thus, these compounds include terpolymers or higher copolymers polymerized randomly or in a block-wise fashion or many variations of sequential additions.

Thus, $(OR)_n$ in the above formula can be written $—A_aB_bC_c—$ or any variation thereof, wherein $a$, $b$, and $c$ are 0 or a number of provided that at least one of them is greater than 0.

It cannot be overemphasized that the nature of the oxyalkylatable starting material used in the preparation of the emulsifier is not critical. Any species of such material can be employed. By proper additions of alkylene oxides, this starting material can be rendered suitable as an emulsifier and its suitability can be evaluated by plotting the oxyalkyl content of said surfactant versus its performance, based on the ratio of the oil to water which can be satisfactorily incorporated into hydrocarbon as a stable emulsion. By means of such a testing system any oxyalkylated material can be evaluated and its proper oxyalkylation content determined.

REPRESENTATIVE EXAMPLES OF Z

| No. | Z |
|---|---|
| 1 | $R\overset{O}{\overset{\|}{C}}—O—$ |
| 2 | $R_n$—⟨⟩—O |
| 3 | R—O— |
| 4 | R—S— |
| 5 | $R—\overset{O}{\overset{\|}{C}}—\overset{H}{\overset{\|}{N}}—$ |
| 6 | $R—\overset{O}{\overset{\|}{C}}—N\diagdown\diagup$ |
| 7 | $R—\overset{H}{\overset{\|}{N}}—$ |
| 8 | $RN\diagdown\diagup$ |
| 9 | Phenol-aldehyde resins |
| 10 | —O— (Ex: Alkylene oxide block polymers.) |

REPRESENTATIVE EXAMPLES OF Z—Continued

| No. | Z |
|---|---|
| 11 | 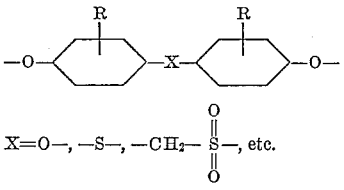 X=O—, —S—, —CH$_2$—$\overset{\overset{O}{\|}}{\underset{\underset{O}{\|}}{S}}$—, etc. |
| 12 | R—S—CH$_2\overset{O}{\overset{\|}{C}}$—O— |
| 13 | RPO$_4$H— |
| 14 | RPO$_4$= |
| 15 | PO$_4$≡ |
| 16 | 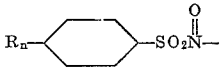 |
| 17 | 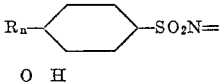 |
| 18 | R$\overset{O}{\overset{\|}{C}}$—$\overset{H}{\overset{\|}{N}}$—  —N$\diagdown$ |
| 19 | Polyol-derived (Ex: glycerol, glucose, pentaerithrytol) |
| 20 | Anhydrohexitan or anhydrohexide derived (Spans and Tweens) |
| 21 | Polycarboxylic derived |
| 22 | —(CHCH$_2$—O)$_n$—<br>    \|<br>   CH$_2$<br>    \|<br>  amine |

Examples of oxyalkylatable materials derived from the above radicals are legion and these, as well as other oxyalkylatable materials, are known to the art. A good source of such oxyalkylatable materials, as well as others, can be found in "Surface Active Agents and Detergents," vols. 1 and 2, by Schwartz et al., Interscience Publishers (vol. 1, 1949—vol. 2, 1958), and the patents and references referred to therein.

In general, the base oxyalkylatable material is tested for solubility in water or toluene, or any other suitable oily material. If it is water soluble, it is oxyalkylated with propylene or butylene oxide until it is just oil soluble, with representative samples being collected as its oxyalkylate content is increased. These samples are tested according to the test shown in Example 88 and its optimum performance determined. If the oxyalkylatable material is oil-soluble, then it is oxyalkylated with ethylene oxide until it is just water-soluble, with representative samples being collected as its oxypropylation or oxybutylation content is increased. These samples are similarly tested. This procedure can thereupon be repeated with another alkylene oxide until opposite solubility is achieved, i.e. if the material is water-soluble it is oxypropylated or oxybutylated until it is oil-soluble. If the prior oxypropylated or oxybutylated material is oil-soluble, it is treated with ethylene oxide until it is water-soluble. This can be repeated in stages each time changing the material to one of opposite solubility by using a hydrophile oxide (i.e. EtO) for an oil-soluble material and a hydrophobe oxide (i.e. PrO or BuO) for water solubility. The same procedure and tests are employed at each stage, proceeding each time to oxylation to opposite solubility.

Although the amount of oxyalkylated material (or other type emulsifiers) present in the final emulsion may be about 0.05–5 volume percent, but preferably about 0.2–3%, larger amounts can also be employed if desired. However, economics generally restrict the amount employed to the ranges indicated.

In practice, the amount of emulsifier injected with the immiscible fluid may be from about 1–75% volume percent or higher of the fluid injected such as 5–50% but preferably from about 10–30%. The exact percentage will depend on the particular conditions of the formation, etc.

The exact range which is useful for the practice of our invention will vary with the starting emulsifier base and the sequence of alkylene oxide used to achieve the polyalkylene ether chains. It should also be noted that materials useful in the practice of our invention can be made by other well-known methods besides oxyalkylation such as the esterification of a polyalkylene ether alcohol, reaction of carboxylic acids with oxyalkylated amines, etc. Thus, the term "oxyalkylated" includes any means of attaching the oxyalkyl group to a molecule. Any method of attaching oxyalkyl groups to a molecule can be employed.

We have also found that the optimum range of effectiveness for any particular emulsifier series will vary with the particular oily phase and also with the composition of the aqueous phase which is employed.

To illustrate the variety of materials that may be used as emulsifiers in the practice of our invention the following examples are presented. It should be noted that these examples are simply illustrative and should not be construed as imposing limitations on the scope of the invention.

EXAMPLE 1

The same general procedure was employed as described in U.S. Patent 2,572,886, Example 1a, columns 9 and 10, except that the starting material was n-decanol. Propylene oxide was added first in a weight ratio of 1.96 parts of oxide to one part of n-decanol, and ethylene oxide was then added in a ratio of 2.61 parts of oxide to one part of n-decanol. The final product was a viscous amber liquid.

Examples 2 through 8 were prepared in the same manner as Example 1 except that the relative amounts of n-decanol, propylene oxide, and ethylene oxide added in the order given were as listed in Table I.

TABLE I

| Ex. No. | Weight n-decanol | Weight Propylene Oxide | Weight Ethylene Oxide |
|---|---|---|---|
| 2 | 1 | 3.67 | 0.00 |
| 3 | 1 | 3.67 | 0.65 |
| 4 | 1 | 3.67 | 1.59 |
| 5 | 1 | 3.67 | 2.24 |
| 6 | 1 | 1.84 | 2.78 |
| 7 | 1 | 3.67 | 3.38 |
| 8 | 1 | None | 2.72 |

In Table II a series of examples are given in which a crude alkyl (C$_3$–C$_{20}$) phenol was treated with ethylene oxide in the method of Example 1.

TABLE II

One part by weight of crude phenol foots was reacted with the parts shown in the table of ethylene oxide.

| Example No.: | Ethylene oxide |
|---|---|
| 9 | 0.9 |
| 10 | 1.0 |
| 11 | 1.1 |
| 12 | 1.2 |
| 13 | 1.27 |
| 14 | 1.31 |
| 15 | 1.37 |
| 16 | 1.47 |
| 17 | 1.56 |
| 18 | 1.75 |
| 19 | 1.97 |
| 20 | 2.2 |
| 21 | 2.28 |

Examples 22 through 33 were made by the same general method described in Example 1 except that the starting material was glycerine. The proportions of reactants are listed in Table III. The alkylene oxides were added in the order given reading from left to right.

TABLE III

One part by weight glycerine to:

| Ex. No. | Parts Butylene Oxide | Parts Propylene Oxide | Parts Ethylene Oxide |
| --- | --- | --- | --- |
| 22 | 2.52 | 34.1 | 5.32 |
| 23 | 2.52 | 34.1 | 10.0 |
| 24 | 2.52 | 34.1 | 21.0 |
| 25 | 2.52 | 34.1 | 25.0 |
| 26 | 2.52 | 28.5 | 5.6 |
| 27 | 2.52 | 28.5 | 9.3 |
| 28 | 2.52 | 28.5 | 13.4 |
| 29 | 2.52 | 28.5 | 18.5 |
| 30 | 9.2 | 24.0 | 5.62 |
| 31 | 9.2 | 24.0 | 12.5 |
| 32 | 9.2 | 24.0 | 20.0 |
| 33 | 9.2 | 24.0 | 24.0 |

EXAMPLE 34

A mixed nonyl-butyl phenol-acid catalyzed-formaldehyde resin was prepared by the method of U.S. Patent 2,499,370, Example 1a.

Example 35 through 48 were prepared by stepwise oxyalkylation of the resin produced in Example 34 by the procedure described in U.S. Patent 2,499,370, Example 1b, except that the proportions of oxides used were as listed in Table IV. The oxides used were as listed in Table IV. The oxides were added in the order given reading from left to right.

TABLE IV

| Example No. | Moles of Propylene Oxide per phenolic unit of starting resin | Moles of Ethylene Oxide per phenolic unit of starting resin |
| --- | --- | --- |
| 35 | 1,012 | 150.8 |
| 36 | 1,012 | 246.1 |
| 37 | 1,012 | 336.5 |
| 38 | 1,012 | 449.0 |
| 39 | 1,012 | 581.0 |
| 40 | 1,012 | 893.7 |
| 41 | 1,012 | 1,343.0 |
| 42 | 848 | 129.1 |
| 43 | 848 | 199.3 |
| 44 | 848 | 285.0 |
| 45 | 848 | 376.1 |
| 46 | 848 | 487.5 |
| 47 | 848 | 756.0 |
| 48 | 848 | 1,147.8 |

EXAMPLES 48, 50, 51

Polyepichlorohydrin-amine compounds were prepared by the methods described in application 820,116, filed June 15, 1959, and assigned to Petrolite Corporation, DeGroote and Cheng.

Example 49 is Example 18b of said application.
Example 50 is Example 19b of said application.
Example 51 is Example 17b of said application.

EXAMPLE 52

The product of Example 49 was treated as in Example 1 except that the starting material was treated with 2.16 parts of propylene oxide, 3.31 parts of ethylene oxide and finally with 19.6 parts of propylene oxide in the order given.

EXAMPLE 53

The product of Example 50 was treated as in Example 1 except that 2.24 parts of propylene oxide, 2.85 parts of ethylene oxide, and 24.3 parts of propylene oxide were used in the order given.

EXAMPLE 54

The produce of Example 51 was treated as in Example 53 except that 2.23 parts of propylene oxide, 2.93 parts of ethylene oxide, and 25.5 parts of propylene oxide were used in the order given.

Table V shows the final composition of materials produced by the treatment of the product of Examples 52, 53 and 54 with successive amounts of ethylene oxide.

TABLE V

| Example No. | Starting Material Product of Example | Percent Additional Ethylene Oxide Based on Starting Material |
| --- | --- | --- |
| 55 | 52 | 10 |
| 56 | 52 | 20.4 |
| 57 | 52 | 30 |
| 58 | 52 | 39.1 |
| 59 | 53 | 10 |
| 60 | 53 | 20 |
| 61 | 53 | 30 |
| 62 | 53 | 40 |
| 63 | 54 | 20 |
| 64 | 54 | 30 |
| 65 | 54 | 40 |

EXAMPLE 66

The procedure of Example 1 was employed except that 1.3-butanediol was the starting material and 3.0 parts of butylene oxide, 32.2 parts of propylene oxide, and 16.6 parts of ethylene oxide were employed in the order given.

EXAMPLE 67

The general procedure of Example 1 was employed except that the starting material was triethylene glycol and that 5.1 parts of butylene oxide, 30.0 parts of propylene oxide, and 22 parts of ethylene oxide were used in the order given.

EXAMPLE 68

The same general procedure as Example 1 was employed except that the starting material was tetraethylene glycol and that 5.1 parts of butylene oxide, 30.0 parts of propylene oxide, and 14.0 parts of ethylene oxide were used in the order given.

EXAMPLE 69

One part of dipropylene glycol was treated with 29.8 parts of propylene oxide and 20.5 parts of ethylene oxide in this order according to the general procedure of Example 1.

EXAMPLE 70

One part by weight of castor oil was treated with 6.8 parts of propylene oxide according to the procedures mentioned above.

EXAMPLE 71

One part by weight of crude tall oil was treated with 3.27 parts of ethylene oxide according to the procedures mentioned above.

EXAMPLE 72

One mole of stearyl alcohol was treated with 3.12 moles of ethylene oxide and then the resulting material was reacted with 1.5 moles sulfamic acid to convert the terminal hydroxyl to a sulfate group.

EXAMPLE 73

The procedure of Example 1 was employed except that the starting material was hexadecanol and 1.2 parts of propylene oxide and 1.5 parts of ethylene oxide added in the order given.

EXAMPLE 74

The compound and procedure of Example 73 was employed except that the amount of ethylene oxide in the second addition was 1.8 parts.

EXAMPLE 75

The procedure of Example 1 was employed except that the starting material was tridecyl alcohol and 1.35 parts by weight of propylene oxide and 4.01 parts by weight of ethylene oxide were employed in the order given.

EXAMPLE 76

Commercial di-dodecylphenol was treated in the manner of Example 1 with 0.64 parts of ethylene oxide.

EXAMPLE 77

The procedure of Example 76 with di-dodecylphenol was used, except that 0.85 parts of ethylene oxide were employed.

EXAMPLE 78

The procedure of Example 76 with di-dodecylphenol was employed, except that 1.06 parts of ethylene oxide were employed.

EXAMPLE 79

The procedure of Example 1 was employed to treat one part of methoxytripropyleneglycol with 5.0 parts of ethylene oxide and 35.0 parts of propylene oxide.

EXAMPLE 80

Two parts of paratertiarybutylphenol were mixed with one part of nonylphenol and one part by weight of this mixture was reacted with 2.36 parts of ethylene oxide according to the method outlined above.

Esters of oxyalkylates may also be employed, such as shown in the following examples:

EXAMPLE 81

674.0 grams of the material of Example 80, 7.6 grams of diglycollic acid, 2 drops of 15% HCl, and 200 ml. of toluene were heated together in a one liter flask fitted with stirrer, heating mantle, and a Deane-Starke trap and condenser at 140°–160° C. for eight hours. The bulk of the toluene was then stripped off and the result was a light brown, viscous liquid.

EXAMPLE 82

A three-necked Pyrex glass flask was fitted with a stirrer, a thermometer, a Deane-Starke trap and condenser, and a gas purge inlet. Into the flask was put a mixture consisting of

| | | |
|---|---|---|
| Material of Example 13 | g__ | 197 |
| Material of Example 10 | g__ | 175 |
| Maleic anhydride | g__ | 25 |
| Benzene | ml__ | 100 |
| Paratoluenesulfonic acid | g__ | 1 |

The flask was purged with nitrogen and the mixture heated, while stirring, at 160° C. to 180° C. for 12 hours.

EXAMPLE 83

The equipment and procedure of Example 82 were used except that 544 g. of the material of Example 6, 33 g. of maleic anhydride, 2 g. of paratoluenesulfonic acid, and 70 ml. of benzene were used.

EXAMPLE 84

One gram of paratoluene sulfonic acid, 450 g. of the material of Example 73, 25 g. of maleic anhydride, and 70 ml. of benzene were employed according to the general procedure of Example 82.

EXAMPLE 85

24.5 g. of phthalic anhydride, 321 g. of the material of Example 18, 1 g. of paratoluene sulfonic acid, and 100 ml. of toluene were employed according to the general procedure of Example 82.

It should be noted that emulsifiers other than oxyalkylates may be used. The practice of this invention is not to be construed as limited to the employment of oxyalkylates as emulsifiers.

For example, the following non-oxyalkylate may be employed.

EXAMPLE 86

The apparatus of Example 82 was charged with:

| | | |
|---|---|---|
| Morpholine | g__ | 14.5 |
| Triethylenetetramine monohydroxyethyl | g__ | 31.5 |
| Oleic acid | g__ | 94.5 |
| Toluene | ml__ | 100 |

The mixture was heated, with stirring, at 160° C. for 8 hours. 15 ml. of water were removed in the Deane-Starke trap. 85 ml. of toluene were then stripped out of the mixture. The result was a dark brown liquid.

Acylated polyamines including linear acylated polyamines, cyclic amidines such as imidazolines and tetrahydropyrimidines can also be employed as emulsifiers, for example those disclosed in Re. 23,227, 2,466,517, 2,468,163, 2,598,213 and elsewhere which are by reference incorporated into the present application as if part hereof.

Thus, any emulsifier capable of forming the emulsion of this invention can be employed. It is the function of the emulsifier rather than its specific composition that is of interest in forming these emulsions. Therefore a tedious recital of all classes of emulsifiers is omitted.

As is quite evident, new emulsifiers will be constantly developed which could be useful in this invention. It is therefore not only impossible to attempt a comprehensive catalogue of such compositions, but to attempt to describe the invention in its broader aspects in terms of specific chemical names of its components used would be too voluminous and unnecessary since one skilled in the art could by following the testing procedures described herein select the proper agent. This invention lies in the use of suitable emulsifiers in preparing the compositions of this invention and their individual composition is important only in the sense that their properties can effect these emulsions. To precisely define each specific emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of emulsifiers suitable for this invention by means of the evaluation tests set forth herein. In analogy to the case of a machine wherein the use of certain materials of construction or dimensions of parts would lead to no practical useful result, various materials will be rejected as inapplicable where others would be operative. We can obviously assume that no one will wish to make a useless composition or will be misled because it is possible to misapply the teachings of the present disclosure in order to do so. Thus, any emulsifier that can perform the function stated herein can be employed.

In demonstrating the practice of our invention only the simplest equipment is required. Actually useful and novel emulsions with internal phase ratios of over 90% and even over 95% to 99%, can be made by simple hand stirring with a paddle or spoon. In actual practice a wide variety of mixing devices may be used. The following examples will illustrate the great advantages to be gained by the practice of our invention. The examples should not be construed as limitations on the methods which may be employed. These are the types of emulsions formed in situ in the formation when solutions of the emulsion are injected therein under pressure.

EXAMPLE 87

Ten ml. of kerosene and 2 ml. of the material of Example 1 were mixed by shaking in a pint jar. Ten ml. of water was added and the mixture shaken until all the water had emulsified. Additional amounts of water were added, with shaking, until a total of 250 ml. of water had been added. The result was a stiff, almost translucent jelly. This material was found to be stable over the range 10° C. to 50° C. for several weeks. It is a water-in-oil emulsion as shown by the fact that it can be diluted with kerosene to form a thin, white dispersion of water in kerosene. This type of emulsion is employed when in contact with oil rather than water, i.e. an O/W emulsion in the connate fluids.

For the preparation of small laboratory batches of emulsions we prefer to use a kitchen-type mixer, such as the Model C–3, Kitchen Aid Mixer manufactured by the Hobart Manufacturing Company. This mixer uses a two quart glass mixing bowl and a wire beater with a planetary motion. Our testing procedure is as follows:

EXAMPLE 88

Ten ml. of the oily phase is mixed with a suitable amount, usually 2 ml. to 4 ml., of the emulsifier in a glass mixer bowl. With the mixer running at a speed setting of 2 to 6, water is slowly added to the bowl. Initial additions should be made in small amounts, allowing the mixer ample time to incorporate water into the emulsion. As the amount of material in the bowl increases, the mixing action is more efficient and further additions may be made more rapidly. When the mixer will no longer produce an emulsion without a free aqueous phase, the limit of the test is considered to have been reached.

In general, we find that emulsifiers which have heretofore been used for the production of conventional emulsions will not permit the incorporation of more than 20 to 30 ml. of internal phase before breaking or inversion occurs. On the contrary, the materials of our invention allow the incorporation of over 100 ml. of internal phase into a stable emulsion and it is quite common to incorporate 200 ml. or more of internal phase. In fact, we do not usually consider a material suitable for practical use if it does not permit the incorporation of at least about 200 ml. of internal phase per 10 volumes of external phase.

As stated above, a wide variety of materials may be used as emulsifiers in the practice of our invention. However, not all materials of a particular type are suitable for the production of a specific emulsion. As previously stated, the effectiveness of a particular material varies with the composition of both the internal and external phase. We find that the test outlined in Example 88 a simple and convenient method of establishing the optimum material for a particular system.

In general, in the practice of our invention, our preferred method for selection of materials of optimum effectiveness is to prepare a family of related materials and test them for effectiveness in the particular system that is under consideration. A water-soluble base is oxyalkylated with propylene oxide (PrO) or butylene oxide (BuO) until it just becomes oil-soluble and selected members of the series are tested. An oil-soluble base is treated with ethylene oxide (EtO) and similarly tested. A test such as that outlined in Example 88 may be used or any other test that accurately reflects the proposed methods of preparation of the desired emulsion. The results of the tests are then plotted on a model of a multi-dimensional non-commutative composition space that represents the family of materials being used. Such tests and plots reveal the existence of an optimum-performance region in the composition space.

A complete discussion in the use of such non-commutative, composition spaces is found in U.S. Patent 3,083,232, and in the Journal of Chemical Documentation, vol. 3, pp. 103–113 (1963).

As has been previously stated, one of the advantages of our invention is the wide variety of materials that may be incorporated into the compositions and the concomitant variety of properties that may be thus imparted to the final formulations. Four primary variables control the final properties of the formulations. The composition of the external phase, the composition of the internal phase, the emulsifier employed, and the method of mixing. The final formulations are stable, viscous, thixotropic emulsions. Thus, it is possible to convert a fluid, mobile liquid such as water into an extremely viscous form without adding sufficient foreign material to significantly affect its chemical properties. Using the method of Example 87 this fluid material may be converted into a stiff jelly. It should be noted that, although the physical properties of the water have been drastically modified, the final compositions contain less than 5% added material.

The final viscosity of these compositions is a function of the particular emulsifier used, the ratio of the two phases, and the method employed to produce the intimate mixture. Compositions may be formed which vary in consistency from that of thick cream to jellies which are so stiff that they may be cut into pieces and stand unsupported. Thus, the viscosity may be chosen to suit the particular application.

We have prepared emulsions having apparent rest viscosities of at least 800 cps., for example, about 1,000, 10,000, 20,000, 30,000, 40,000, 50,000, 60,000, 70,000, 80,0000, 90,000, 100,000 or higher, all of which are thixotropic and pumpable under shear.

Any suitable emulsifier can be employed including those described in S.N. 286,877, now abandoned, 302,001 and 302,177, now abandoned. Although oxyalkylated emulsifiers are preferred, any other emulsifier capable of preparing these emulsions can be employed.

By employing the above techniques one can select a desirable emulsifier to be employed in a subterranean formation. However, it is generally preferable to employ the connate fluids found in the well in place of water.

For example, a suitable emulsifier can be selected in the following manner:

(1) Connate fluids (oil or water) from the well are obtained and mixed with the immiscible opposite phase of the emulsion containing the emulsifier (water in the case of oil and oil in the case of water) until an emulsion is formed having the desired external phase, i.e. oil when in contact with water and water when in contact with oil. The internal phase should be high, usually at least about 70% by volume, for example about 80–95%, such as about 85–95%, but preferably about 88–93%. The viscosity of the emulsion should be sufficient to block the permeable formation.

These emulsions are stable, viscous and thixotropic. In general they have a rest viscosity of at least about 800 cp., measured with a Brockfield Viscometer using a #4 spindle at 6 r.p.m., for example from about 800 cp. to 180,000, such as about 900 cp. to 120,000, but preferably from about 1,000 cp. to 100,000 cp.

It should be noted that the emulsions of this invention are thixotropic, i.e. as pressure is put upon them, their effective viscosities decrease. As the rate of shear employed in measuring viscosity increases, the effective viscosity decreases. Thus, although the emulsions when stationary or at low shear behave like thick jellies, they will become fluid when pumped and regain their viscosity as they slow down. This thixotropy is a general property of the emulsions of this invention.

The emulsions of this invention can be tested in the following manner.

*Core material.*—Cores ¾″ in diameter and varying in length from 0.125″ to 0.78″ were cut from strongly consolidated sandstones. Samples were cleaned by Soxhlet extraction with acetone followed by oven drying at 210° F. Air permeability measurements were made to classify core material and to provide experimental control.

*Testing procedure.*—The core samples were mounted inside short lengths of galvanized pipe using Armstrong A–2 adhesive to seal the rock in place. The pipe encased cores were then mounted between end plates using gaskets to provide a seal between the end plates and the pipe. In this way a pressure tight system is produced so that an emulsion can be forced into the core or produced in situ, and water can subsequently be used to pressure test the strength of the emulsion in the pores of the sandstones.

The testing procedure may be briefly described as follows:

(1) Saturate the core with the emulsion and remove the excess from the face of the core.

(2) Determine the strength of the emulsion plug by forcing water against the face of the core (usually the pressure is applied in the opposite direction from that for the emulsion injection).

(3) Ascertain the pressure sustained by the plug by measuring the magnitude of the nitrogen pressure used to force the water against the face of the core.

(4) Increase pressure stepwise, using an increment of about 30 p.s.i. at two- or three-minute intervals, until flow of fluid through the core is observed.

The following examples are presented to illustrate the present invention.

*Compound A*

Octylphenol was conventionally oxyalkylated in the presence of NaOH with 0.6 parts of EtO per part of phenol. This emulsifier was employed as a 50% solution in diesel fuel.

*Compound B*

An imidazoline of the formula

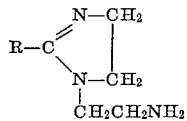

was prepared where R is oleic acid derived.

This emulsifier was employed as a 50% solution in a diesel fuel.

FIELD USE I

A well subject to water intrusion first had its standing water removed by pumping, bailing or swabbing. Thereupon, the 50% solution of emulsifier A was injected under pressure ("squeezing") in such a manner that the solution was displaced into the formation. In this way the unique emulsion of this invention is formed. When the well was returned to normal production condition, it was found that water intrusion had been significantly reduced.

FIELD USE II

A well under drilling starting taking mud (i.e. it lost mud to the formation). Thereupon the 50% solution of emulsifier B was "squeezed" into formation until pressure was built up to 1,200 p.s.i. in the drill pipe and 950 p.s.i. on the annulus. Thereupon pumping was stopped. After standing undisturbed for one hour, 500 p.s.i. remained on the drill pipe. The system was then repressurized to 1,000 p.s.i.

After 2½ hours, full circulation was established at normal circulating pressure and the well was circulated with 9 lb. mud. After about 20 hours, the mud weight was increased to 10 lbs. with full returns and the well was circulated to approximately 500 ft. off bottom.

The well was logged, casing was run and cemented in the usual manner.

FIELD USE III

A thermoflood had difficulty in maintaining fire evenly distributed over the entire perforated section of the formation. After an injection well had been used for a period of time, oxygen injected at the surface to supply the fire would channel into a narrow area so that this area received all the fire.

To correct this, in accord with this invention, 40 barrels of water were injected into the formation which would channel into this narrow section. Thereupon 20 gallons of Compound B mixed with 5 barrels of lease crude were injected into this narrow section. Thereupon the injection of oxygen was renewed and a blocking emulsion was formed in situ.

An injection profile after emulsion blocking indicated that channelling had been corrected.

The above examples have been given by way of illustration only and are not intended to limit the scope of this invention which is applicable to reducing the porosity of any suitable subterranean formation. In view of the above disclosure and examples many variations and different applications of use will be evident to one skilled in the art.

We claim:

1. A method of reducing the porosity of subterranean porous formations which is characterized by injecting into said formations a fluid immiscible with the connate fluid and containing in said fluid, emulsifier capable of emulsifying the connate fluid into the immiscible injected fluid so as to produce a viscous, high internal phase, thixotropic emulsion, the internal phase of said emulsion comprising at least about 70% by volume of the emulsion, said emulsion having a viscosity sufficient to block the permeable formation.

2. The method of claim 1 wherein the internal phase of said emulsion comprises about 80–95% by volume of the emulsion.

3. The method of claim 1 wherein the internal phase of said emulsion comprises about 85–95% by volume of the emulsion.

4. The method of claim 1 wherein the internal phase of said emulsion comprises about 88–93% by volume of the emulsion.

References Cited

UNITED STATES PATENTS

| | | | |
|---|---|---|---|
| 2,377,529 | 6/1945 | Stephenson | 166—42 |
| 2,793,188 | 5/1957 | Swain et al. | 166—42 |
| 2,801,218 | 7/1957 | Menaul. | |
| 2,851,105 | 9/1958 | Garst | 166—42 |
| 2,860,103 | 11/1958 | Buchanan et al. | 166—42 X |
| 2,874,779 | 2/1959 | Johnson | 166—42 |
| 2,935,129 | 5/1960 | Allen et al. | 166—42 |
| 3,099,624 | 7/1963 | Wilson. | |
| 3,294,164 | 12/1966 | Hardy et al. | 166—11 X |

CHARLES E. O'CONNELL, *Primary Examiner.*

STEPHEN J. NOVOSAD, *Examiner.*